Figure 1:
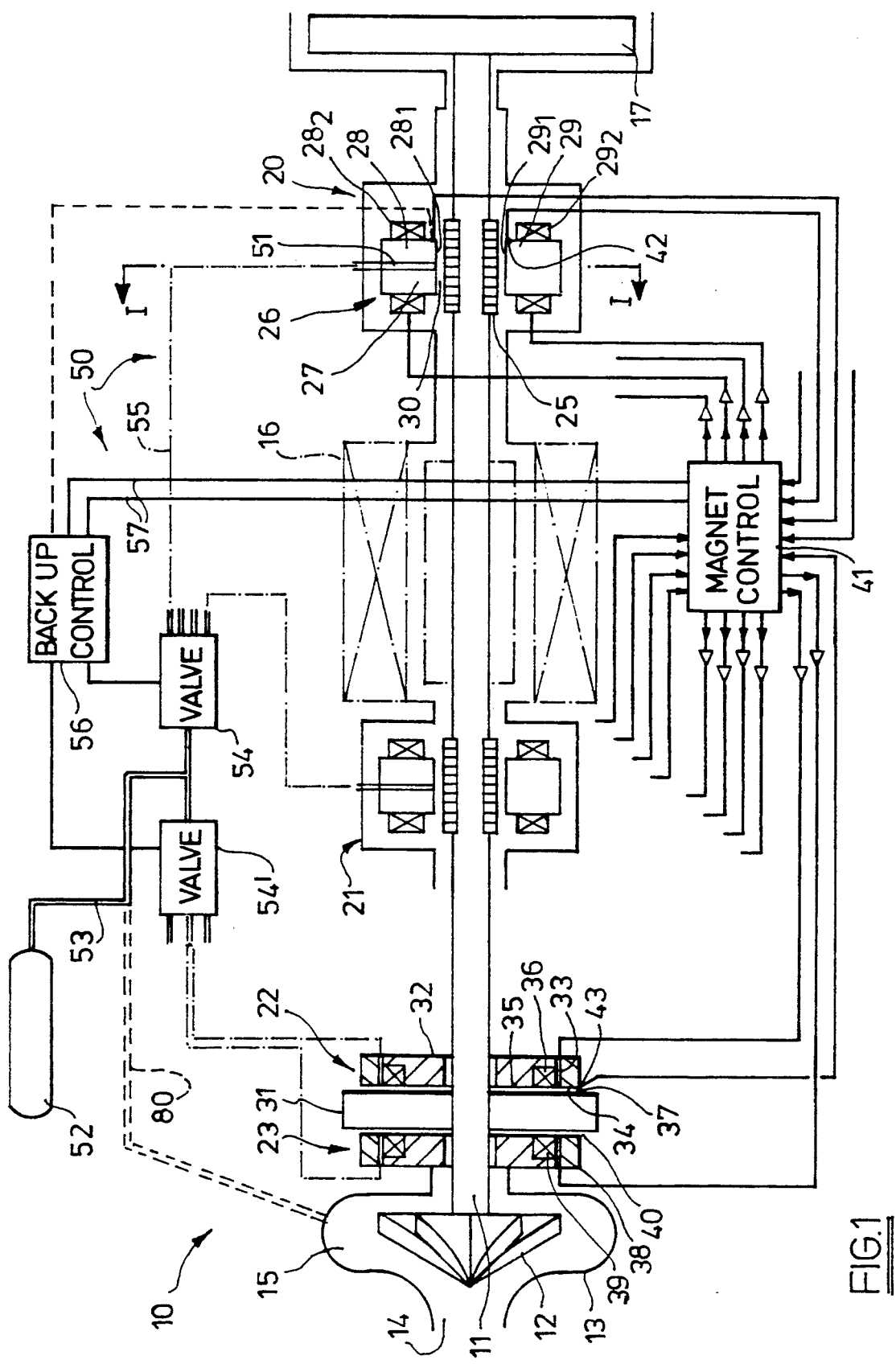

United States Patent [19]
New

[11] Patent Number: 5,355,040
[45] Date of Patent: Oct. 11, 1994

[54] MAGNETIC BEARING BACK-UP

[75] Inventor: Nigel H. New, Harrow, United Kingdom

[73] Assignee: The Glacier Metal Company Limited, Middlesex, England

[21] Appl. No.: 91,189

[22] Filed: Jul. 14, 1993

[30] Foreign Application Priority Data

Jul. 23, 1992 [GB] United Kingdom ............... 9215691.8

[51] Int. Cl.$^5$ ........................ H02K 7/09; H02K 7/08
[52] U.S. Cl. ................................ 310/90.5; 310/90
[58] Field of Search ............... 310/90, 90.5; 384/100, 384/102, 114

[56] References Cited

U.S. PATENT DOCUMENTS

| | | | |
|---|---|---|---|
| 3,356,425 | 12/1967 | Carriere et al. | 310/90.5 |
| 3,639,074 | 2/1972 | Killick | 384/100 |
| 4,180,946 | 1/1980 | Heijkenskjold et al. | 310/90.5 |
| 4,641,978 | 2/1987 | Kapich | 384/102 |
| 4,764,085 | 8/1988 | Jesinger | 310/90.5 |
| 4,809,354 | 2/1989 | Kawashima | 384/114 |
| 4,827,169 | 5/1989 | Habermann | 384/114 |
| 4,929,158 | 5/1990 | Girault | 417/405 |
| 4,958,098 | 9/1990 | Sarraf | 310/90 |
| 4,982,126 | 1/1991 | Jolivet et al. | 310/90.5 |
| 5,059,845 | 10/1991 | Wilson | 310/90.5 |
| 5,104,284 | 4/1992 | Hustak, Jr. et al. | 310/90.5 |
| 5,126,612 | 6/1992 | Girault | 310/90.5 |

FOREIGN PATENT DOCUMENTS

| | | |
|---|---|---|
| 3741451 | 5/1990 | Fed. Rep. of Germany . |
| 9112813 | 1/1992 | Fed. Rep. of Germany . |
| 0073624 | 3/1983 | Japan .................. 310/90.5 |
| 982507 | 2/1965 | United Kingdom . |

Primary Examiner—Steven L. Stephan
Assistant Examiner—C. LaBalle
Attorney, Agent, or Firm—Nixon & Vanderhye

[57] ABSTRACT

A back-up bearing (50, FIG. 1) is provided for a magnetic journal or thrust bearing by a source of pressurized fluid 52 (such as gas), channels 51 supplying the fluid to the suspension gap 30 between moving bearing armature 25 and stationary armature pole faces $28_1$, $29_1$, and magnet control means 56 responsive to a decrease in gap width at any point below an acceptable minimum to supply the fluid by way of the channel(s) to the gap to form a hydrostatic bearing between stationary and movable armatures to aid or replace the magnetic bearing support. In a journal bearing, (FIG. 3) in which coil-containing spaces (62) exist between radially extending armature limbs the spaces may be closed by an apertured bridging piece (64) extending between pole faces and fluid supplied via that space to provide both increased hydrostatic bearing area and a way of cooling the coil by a low pressure fluid bleed at all times. The armatures faces may be provided with low friction bearing material to permit rubbing contact at very low speeds or rest.

18 Claims, 3 Drawing Sheets

MAGNETIC BEARING BACK-UP

This invention relates to magnetic bearing arrangements for supporting a rotatable shaft against radially acting forces as journal bearings and against axially acting forces as thrust bearings, and in particular relates to so-called back-up bearings for such arrangements which are intended to operate in the event of the magnetic bearings failing to provide proper support for the shaft against such forces.

Magnetic bearings may be passive, comprising only permanent magnets, or active, comprising electromagnetic bearings, with or without permanent magnets.

In this specification the term "magnetic bearing" when used in an unqualified sense is intended to encompass both kinds and within context of relating to one kind or the other, as a convenient reference to that type of bearing arrangement, that is, with the qualification active or passive implied.

Active magnetic bearings for supporting shafts (or other moving bodies) exist in different forms for acting in journal and thrust roles. Usually an armature of suitable ferromagnetic material is formed on, in, or by the shaft to comprising a movable armature and electromagnets are disposed adjacent the movable armature arranged uniformly about the shaft to form stationary armature means. Each electromagnet comprises a ferromagnetic core having one or more limbs, about which one or more electromagnet coils are wound, ending in pole faces which face the movable armature, the core and armature defining a magnetic circuit which includes a small air gap between them. In operation the shaft is suspended with its armature between the pole faces, and a suspension gap between the shaft armature and the individual pole faces is maintained in excess of a predetermined minimum width, at which physical contact may occur, by controlling the currents in the various electromagnet coils in response to sensing the actual gap width.

In practice, because of the possibility of electrical failure or of an exceptional force acting on the shaft that the electromagnetic force is unable to counter, such magnetic bearings are often provided with back-up bearing means which comprises one part carried by the shaft and another part stationary and separated from said one part, when the magnetic bearing is in operation, by a gap which is less than the physical separation between pole faces and armature of the magnetic bearing and which then defines said predetermined minimum gap width, the intention being that if the shaft is displaced from its normally central position within the gap by sufficient extent the back-up bearing parts will contact as running surfaces to support the shaft temporarily.

Passive magnetic bearings tend to operate by repulsion between permanent magnets, being used mainly, but not exclusively, in a thrust bearing role. Although passive magnetic bearings are not susceptible to internal power failure in respect of their ability to provide suspension forces, they are susceptible to external forces acting thereon and may also require back-up bearing means to prevent collision between rotor and stator parts.

The provision of such back-up bearing means is itself not without problems. Machine shafts for which magnetic bearings are suitable tend to rotate at very high speeds for which other bearing types are unsuitable, and contacting running surfaces of a back-up bearing may have difficulty in operating or commencing operation if such contact is made at high speed and/or may be required to dissipate large quantities of heat generated by friction. Proposals have been made for back-up bearings which have higher friction, but better able to operate at higher speeds, combined with lower friction parts able to operate at lower speeds, but notwithstanding any relative efficiencies of such complementary back-up bearing structures, they produce heat for the dissipation of which elaborate precautions are necessary and there remains what may be an additional problem of the space required for, and occupied by, back-up bearing means in addition to the conventional electromagnetic elements.

It is an object of the present invention to provide a magnetic bearing arrangement which includes back-up bearing means that mitigates at least some of the above outlined disadvantages of known back-up bearings.

According to one aspect of the present invention a magnetic bearing arrangement for a rotatable shaft, includes movable armature means movable with the shaft, stationary armature means forming with the movable armature means a magnetic circuit including a suspension gap between them, and back-up bearing means, the back-up bearing means including fluid channels communicating with the suspension gap, a source of pressurised fluid and back-up control means responsive to a detected inability of the magnetic bearing arrangement to suspend the shaft within a predetermined range of operational shaft positions to cause supply of said fluid to the suspension gap to form therein a film at such hydrostatic pressure as to support the shaft within said predetermined range of operational shaft positions.

According to another aspect of the invention a turbomachine operable to process a fluid at elevated pressure includes a magnetic bearing arrangement as defined in the preceding paragraph. In such a turbomachine the back-up bearing means fluid may be derived at least in part from the process fluid.

Figure 2:
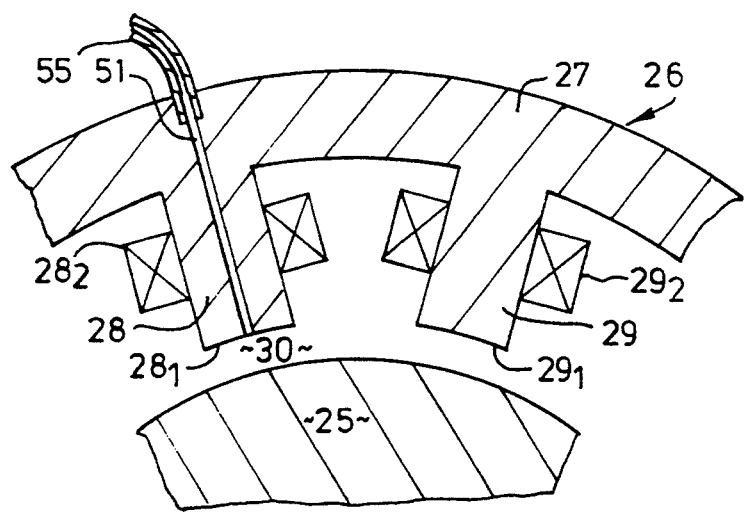
Figure 3:
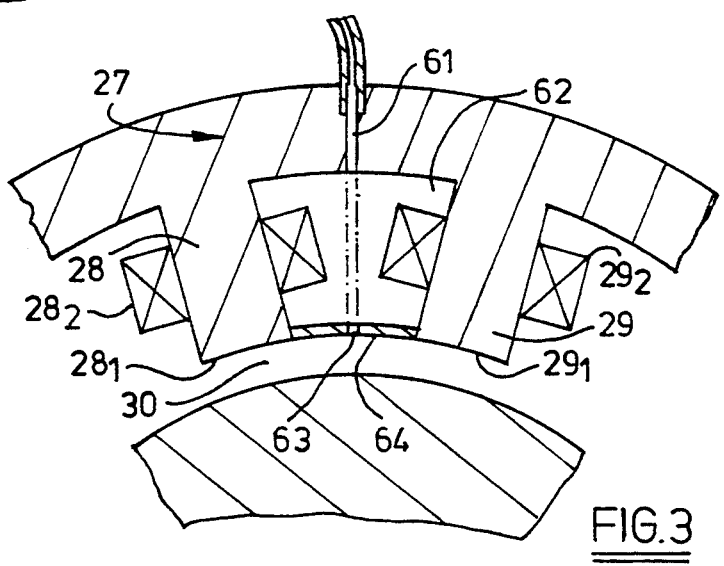
Figure 4:
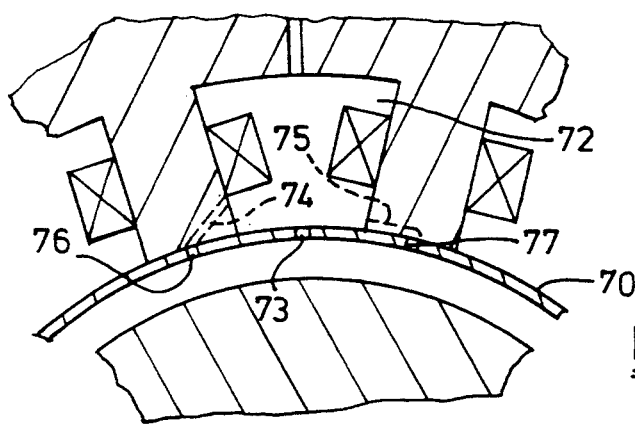
Figure 5:
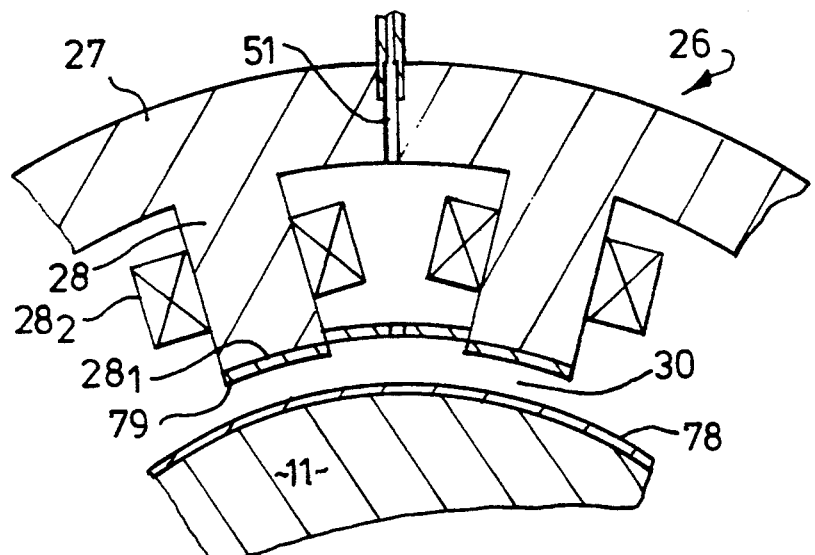
Figure 6:
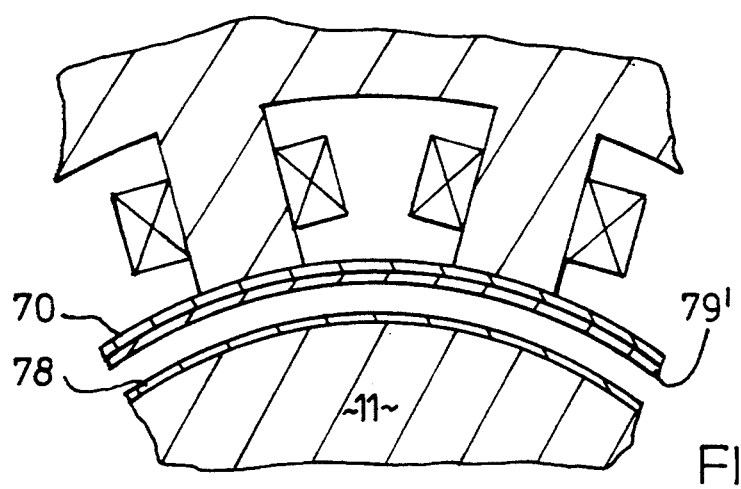

Embodiments of the invention will now be described by way of example with reference to the accompanying drawings, in which:

FIG. 1 is a schematic representation of a turbomachine including an active magnetic bearing arrangement in accordance with the present invention illustrating both magnetic radial, or journal, bearings and magnetic axial, or thrust, bearing and back-up bearing means therefor, FIG. 2 is a fragmentary cross-sectional view along the line I—I of FIG. 1 showing the first form of implementation of the back-up bearing means associated with the journal bearing, FIG. 3 is a cross-sectional view similar to FIG. 2 but showing a second form of implementation of the back-up bearing means associated with the journal bearing, FIG. 4 is a cross-sectional view similar to FIG. 2 but showing a third form of implementation of the back-up bearing means associated with the journal bearing, FIG. 5 is a cross-sectional view similar to FIG. 2 but showing a fourth form of implementation of the back-up bearing means associated with the journal bearing, and FIG. 6 is a cross-sectional view similar to FIG. 2 but showing a fifth form of implementation of the back-up bearing means associated with the journal bearing.

Referring to FIG. 1, a turbomachine 10 includes a shaft 11 at one end of which is carried an impeller 12 disposed in a housing 13 having an inlet duct 14 for fluid to be processed thereby and an outlet duct 15 from which process fluid is supplied at high pressure. The shaft is suspended with respect to active magnetic bearings and may be rotated by an electric motor, indicated ghosted at 16 and having a rotor coaxial with shaft 11, or by a fluid impeller 17 in receipt of fluid at elevated pressure. The driving fluid and/or the driven (compressed) fluid may be a liquid or a gas, but in practice it is more usual to find magnetic bearings in use where rotational speed of the shaft is high and the process fluid is a gas.

The nature of the machine is not directly important to an explanation of the invention and is shown and described only to such extent as is necessary in relation to magnetic bearings 20, 21 which support the shaft as journal bearings and magnetic thrust bearings 22 and 23.

The journal bearing 20 comprises a movable armature 25 defined on, at, or in the surface of the shaft 11 and formed in conventional manner of laminations of ferromagnetic material which may form part of a magnetic circuit minimising the formation of eddy currents as the shaft rotates. Disposed adjacent the shaft is stationary armature means 26 which comprises a plurality of electromagnets arranged about the shaft, typically four at 90° intervals. Referring also to FIG. 2, each electromagnet comprises a ferromagnetic core 27, again made up of laminations, having a plurality of limbs 28, 29 extending radially inwardly and each ending in a pole face $28_1$, $29_1$ respectively, facing, and spaced slightly from, the movable armature 25 when it is disposed suspended centrally within the bearing by a suspension gap 30. The core, and typically each limb supports an electromagnet coil $28_2$, $29_2$. The other electromagnets are similar. The other journal bearing 21 is identical. Each journal bearing, and preferably each electromagnet thereof, has associated with it a displacement sensor for providing a signal representative of the separation between the movable armature and each pole face.

The magnetic thrust bearing 22 serves to "suspend" the shaft in an axial direction against an axial thrust exerted on the shaft aerodynamically, such as by the process or driving gas. It includes a movable armature in the form of radially extensive rotor 31 carried by the shaft 11 and, facing one side of the rotor, stationary armature means comprising electromagnet 32 in the form of an annular ferromagnetic core encircling the shaft and including an annular groove 33 facing the rotor defining on the core annular pole faces 34, 35 and containing an electromagnet coil 36, the rotor being normally suspended in an axial direction by a balancing of axial forces on the shaft with a gap 37 between the rotor and each pole face.

A second magnetic thrust bearing 23 is formed by the rotor 31 and stationary armature means comprising electromagnet 38, containing electromagnet coil 39, disposed facing the opposite face of the rotor from the electromagnet 32 and spaced from the rotor by suspension gap 40. However, if the shaft is subjected to a continuous external axial force, such as an aerodynamic thrust acting on an impeller, then an electromagnet may be required only to one side of the rotor 31 to counter this, whereas in the absence of such continuous force, electromagnets may be disposed on both sides to effect opposing forces.

In operation, the electromagnets of each journal or thrust bearing are energised differentially in order to maintain, ideally, a uniform suspension gap between each pole face and the moveable armature in response to the sensed displacements between the moveable armature and each pole face by means of magnet control means 41 provided with radial shaft displacement signals by sensing means 42 and axial shaft displacement signals by sensing means 43. The speed and severity of increased magnetic force between the moveable armatures 25 or 31 and any pole face in response to sensing an increase in gap width between them and/or decrease in gap width in the opposite direction must clearly effect a counter force on the shaft before the armature and pole can collide, and to this end, such bearings are usually highly responsive to small shaft displacements, that is, have great stiffness.

Conventionally, a back-up bearing (not shown) would be provided alongside each of the magnetic bearings 20, 21 and would be required to have a normally moving part on the shaft and a normally stationary part disposed and aligned to be separated in operation by a suspension gap smaller than 30 such that they come into engagement before the shaft armature 25 can engage pole faces $28_1$, $29_1$ either in the event of power failure to the coils or in response to a large irresistible displacement force on the shaft; a similar back-up bearing would likewise be provided for the thrust bearings 22 and 23.

Thus a predetermined range of operational shaft positions in which the magnet control means conventionally is able to operate effectively is less than the full range of physical movements and the back-up bearing requires installation and alignment to finer tolerances than the electromagnets and occupies space along the shaft that may be difficult to provide without compromising on the dimensions of other features.

In accordance with the present invention in the magnetic bearing arrangement, and represented by the journal bearing 20, back-up bearing means indicated generally at 50 includes associated with a plurality of said pole faces, one being $28_1$, uniformly distributed about the shaft fluid channels such as 51 communicating with the suspension gaps between said pole faces and the movable armature means 25. A source 52 of pressurised fluid comprises a gas cylinder containing a gas, conveniently air but possibly an inert gas, at elevated pressure and is connected to each channel 51 by way of common supply line 53, control valve 54 and distribution line 55. The control valve 54 is under the control of back-up control means 56, the latter being connected to the magnet control means 31 by way of lines 57 to receive signals indicative of the inability of the magnet control means being able to support the shaft within said predetermined range of operational shaft positions dispersed by suspension gap 30.

Although such signals for use by the back-up control means may be derived directly from the sensors 42 or from a completely different set (not shown), to make the back-up bearing means completely independent of the magnetic bearing, and equally responsive to loss of control after it is manifested by shaft position, it will be appreciated that if loss of control is due to electrical failure of the magnetic bearing then such change of shaft position may be anticipated at the magnet control means before its inevitable occurrence. That is, by deriving the back-up control signals from the magnetic control means it may be possible to detect an inability of the magnetic bearing to support the shaft within said predetermined range of operational shaft positions other than by direct measurement resulting from displacement.

In operation of the magnetic bearing arrangement, in response to a detected inability of the magnetic bearing 20, or possibly any bearing at all, to support the shaft in the said predetermined range of operational shaft positions, the back-up control means 56 opens the valve means 61 to supply fluid by way of the ducts 51 to the support gap 58 to form therein a fluid film of such hydrostatic pressure as to then support the shaft clear of the stationary pole faces $28_1$, $29_2$, that is, support the shaft within said predetermined range of operational shaft positions.

As indicated above, it is usual for the predetermined range of operational shaft positions to be small and for the gap between the running surfaces of the back-up bearings to be small so that a complete annular fluid film may be formed and the load of the shaft taken by the hydrostatic pressure maintained throughout the film at any time and irrespective of direction of shaft displacements.

Furthermore, in such situation the support pressure will be self-regulating in that any localised variations in shaft load on the fluid film due to external forces serves only to restrict any fluid leakage at that point and thus to increase the pressure of the supporting film.

It will be appreciated that even if such hydrostatic fluid film is not continuous about the shaft but exists at load bearing sites distributed about the shaft then if the fluid is supplied concurrently to all running surfaces the same self-regulating effect occurs.

It will be appreciated that the pressure of fluid supplied to each of the channels may be controlled independently of each other in accordance with the locally sensed width of the suspension gap 30 in order to effect differential force control analogously to the electromagnets of the magnetic bearing (notwithstanding that the "repulsive" force of the hydrostatic pressure is applied diametrically opposite to the "attractive" force of an electromagnet acting in the same direction), or alternatively, fluid may be supplied to all channels together, relying upon a pressure increase in the gap between the pole face and shaft armature as the gap is forced to reduce in width (and coupled with a corresponding increase in width of a diametrically opposed portion of the gap) to represent an increase in suspension stiffness in that displacement direction such that the shaft position is self-correcting.

Thus if the back-up bearing means is caused to operate because of an isolated excursion of the shaft from its normal running position, the hydrostatic back-up bearing means assists the magnetic bearing in restoring the position of the shaft after which the conditions that cause it to function will cease to exist. On the other hand, if back-up bearing operation results from a failure of the magnetic bearing, the hydrostatic bearings formed by the various pole faces and the shaft armature will support the shaft as the machine is run down, to, and including, rest.

It will be appreciated that a number of modifications may be effected to achieve the desired hydrostatic bearing effect with corresponding trade-offs between complexity of construction and additional features.

For instance, in the arrangement of FIG. 1 and 2, the channel 51 may be formed so as to extend to each and every pole face. Furthermore, to assist in speeding the formation of the hydrostatic bearing, an amount of gas may be permitted to bleed from the channels at low pressure so that the channels are at least filled with gas and the hydrostatic pressure can be readily established.

Furthermore, such gas flow may assist in maintaining the channels 51 and suspension gap 30 free of any dirt particles which could affect magnetic bearing operation and to extract any excess heat from the electromagnet core.

A second form of back-up bearing means for such a journal bearing is shown in FIG. 3 in a view similar to that of FIG. 2. In this arrangement the channel 61 (corresponding to channel 51) extends to the suspension gap 30 through a portion of the stationary armature means containing an electromagnet coil, such as through the space 62 between adjacent limbs 28 and 29. The channel may extend (as shown by dotted portion) substantially to the radial level of the surrounding pole faces, and open into the gap 30 by way of one or more apertures 63 in bridging means 64 extending between the adjacent pole faces. The bridging means 64 may be arranged at such radial level to form a continuous surface with the pole faces or may be radially outward to form a small plenum chamber.

The duct 61 preferably opens into the space 62 from which gas emerges to the gap 30 by way of said aperture(s) 63 and furthermore, by permitting the aforementioned bleeding, heat is extracted directly from the electromagnet means. In operation of the back-up bearing means hydrostatic pressure acts over a greater bearing area than provided by the individual pole pieces alone as in FIG. 2.

Referring now to FIG. 4, it will be seen that instead of providing bridging means 64 between each pair of pole faces, the bridging means 70 may comprise a continuous sheet of non-ferromagnetic material formed into a cylinder that overlays the pole faces and forms chambers 72 between the core limbs that contain the electromagnet coils. Apertures 73 permit both bleeding of gas to effect cooling of the coils and the development of hydrostatic bearing pressure as described above.

It will be appreciated that such a sheet 70 may be used with the arrangement of FIG. 2, that is, apertures 51 through the pole faces and/or additional channels (74,–75) and apertures (76, 77) shown ghosted and extending between the chamber 72 and the pole faces to increase the number and distribution of outlets.

It will be appreciated that although the back-up bearing means may by the provision of such a hydrostatic fluid bearing, support the shaft as its speed is reduced to zero in the event of electromagnet failure, in practice it may be preferred that at low speeds a traditional surface-contact making bearing is more appropriate. Referring now to FIG. 5, it will be seen that in, for example, the bearing arrangement of FIG. 3, the rotatable armature 25 and the pole faces $28_1$ etc of the stationary armature may carry a layer of low-friction material 78, 79 respectively to enable the surfaces to contact without damage, at least at low speeds. Reference to FIG. 6 shows a corresponding modification to the arrangement of FIG. 4, where in the continuous sheet 70, comprising the bridging means extending between and over the pole faces, carries the layer of low-friction bearing material 79'. It will be understood in the provision of such contact making bearing, the low friction material may be confined to one running surface only.

In the above description, it has been assumed that the bearing fluid is a gas provided by a separate source 52. It will be appreciated that in a turbomachine such as 10, in which a process gas is delivered by the machine at high pressure or is supplied to the machine at high pressure to operate it, such gas may be employed in place of the separate source 52, as indicated by broken line 80 extending between the housing 13 and control valve 54. Clearly if such gas pressure is the product of the shaft rotation, then any bearing support from it will decrease if the machine is slowed due to magnetic bearing failure and in such circumstances the contacting bearing surfaces shown in FIGS. 5 and 6 or an alternative would be essential.

Also, it will be appreciated that the fluid employed may be liquid rather than gas.

The above description of back-up bearing means has concentrated on the journal bearing 20, and that for journal bearing 21 will be identical, reference numerals therefor being omitted for clarity. It will be appreciated that an analogous arrangement can be provided for the electromagnetic thrust bearing arrangement 22, 23, comprising essentially channels 81, 82 passing through the respective cores 32 and 38 to the suspension gaps 37 and 40 by way of the core and/or electromagnet coils for cooling thereof, provided the primary objective of being able to form a supportive hydrostatic bearing is achieved. Because of the different circumstances and forces acting on the journal and thrust bearings, optionally separate control valve means 54' is shown employed and if desired separate back-up control means may also be employed.

It will be understood that whereas in respect of a hydrostatic back-up bearing it may not matter in which direction shaft displacement occurs to take it to the limit of its predetermined operational range, in the case of a thrust bearing it may be more significant. Whereas it may be considered appropriate to have only one magnetic bearing to counter a unidirectional external thrust on the shaft, if back-up support for a sudden increase in such force is to be provided by such magnetic bearing means then both bearings 22 and 23 will be required.

In all of the above it will be seen that disregarding the pressure source, control and valve means, which can be located remotely, the only addition to back-up bearing components near the shaft are the fluid supply lines 55 etc, whereas the remaining back-up bearing components, the channels, bridging means and possibly low-friction running surfaces are all contained within the original magnetic bearing structure.

The above described embodiments have all related to the provision of back-up bearing arrangements for electromagnetic bearings wherein inability of the bearing arrangement to suspend the shaft within a predetermined range of operational shaft positions is readily (although not necessarily) determined by the electromagnetic bearing control means, or at least position sensing means associated therewith.

It will be appreciated that back-up bearing means may be provided in a similar manner for a passive magnetic bearing, notwithstanding the possible requirement for specific position sensing means corresponding to 42 and/or 43 of FIG. 1 for providing signals to back-up control means corresponding to 56. Of course in such a passive bearing there are no electromagnetic coils to benefit from a cooling flow of the back-up bearing fluid or be a cause of bearing failure, but in other respects operation and effect are analogous.

I claim:

1. A magnetic bearing arrangement for a rotatable shaft, including movable armature means movable with the shaft, stationary armature means forming with the movable armature means a magnetic circuit including a suspension gap between them, and back-up bearing means, the back-up bearing means including fluid channels communicating with the suspension gap, a source of pressurised fluid and back-up control means responsive to a detected inability of the magnetic bearing arrangement to suspend the shaft within a predetermined range of operational shaft positions to cause supply of said fluid to the suspension gap to form therein a film at such hydrostatic pressure as to support the shaft within said predetermined range of operational shaft positions.

2. An arrangement as claimed in claim 1 in which at least one of said fluid channels extends through the body of a ferromagnetic core of the stationary armature means and opens onto a pole face thereof.

3. An arrangement as claimed in claim 1 in which said magnetic bearing arrangement comprises an electromagnetic bearing arrangement, wherein the stationary armature means has electromagnetic coil means and ferromagnetic core means disposed with pole faces thereof extending about the shaft, and including magnet control means operable to control the electric current in the coil means as a function of suspension gap width with respect to the pole faces, and said back-up control means is responsive to failure of said magnet control means to suspend the shaft within said predetermined range of operational shaft positions.

4. An arrangement as claimed in claim 3 in which at least one channel extends through a portion of the stationary armature means containing said electromagnetic coil.

5. An arrangement as claimed in claim 1 in which the back-up control means is arranged to bleed fluid at low pressure into said suspension gap during normal operation to extract heat from the stationary armature means.

6. An arrangement as claimed in claim 1 in which the fluid is a gas.

7. An arrangement as claimed in claim 6 in which the gas is air.

8. An arrangement as claimed in claim 6 in which the gas is an inert gas.

9. An arrangement as claimed in claim 6 in which the arrangement forms part of a turbomachine operable to process gas at elevated pressure and said back-up bearing means fluid gas is derived at least in part from said process gas.

10. An arrangement as claimed in claim 1 in which at least one of said facing surfaces of said movable armature means and said stationary pole faces are provided with bearing material operable to facilitate contacting running at low shaft speeds.

11. An arrangement as claimed in claim 1 in which the magnetic bearing is a journal bearing for the shaft, said stationary pole faces being disposed radially outwardly of said shaft.

12. An arrangement as claimed in claim 1 in combination with a turbomachine operable to process a fluid at elevated pressure.

13. An arrangement as claimed in claim 12 wherein the back-up bearing means fluid is derived at least in part from the process fluid.

14. An electromagnetic bearing arrangement for a rotatable shaft, including movable armature means movable with the shaft, stationary armature means forming with the movable armature means a magnetic circuit including a suspension gap between them, and back-up bearing means, the back-up bearing means including fluid channels communicating with the suspension gap, a source of pressurized fluid and back-up control means responsive to a detected inability of the magnetic bearing arrangement to suspend the shaft within a predetermined range of operational shaft positions to cause supply of said fluid to the suspension gap to form therein a film at such hydrostatic pressure as to support the shaft within said predetermined range of operational shaft positions,
- wherein the stationary armature means has electromagnetic coil means and ferromagnetic core means disposed with pole faces thereof extending about the shaft, and including magnet control means operable to control the electric current in the coil means as a function of suspension gap width with respect to the pole faces,
- and wherein said back-up control means is responsive to failure of said magnet control means to suspend the shaft within said predetermined range of operational shaft positions,
- and further wherein at least one channel extends through a portion of the stationary armature means containing said electromagnetic coil, each said channel opening to a gap formed in the core between two adjacent pole faces and includes bridging means extending between said adjacent pole faces.

15. An arrangement as claimed in claim 14 in which the magnetic bearing is a journal bearing for the shaft, said stationary pole faces being disposed radially outwardly of said shaft and the pole faces surrounding said shaft are joined by bridging means providing a substantially continuous cylindrical surface surrounding said movable armature means.

16. An arrangement as claimed in claim 15 in which said stationary pole faces are provided with bearing material operable to facilitate contact running at low shaft speeds, said bearing material also forming the surface of the bridging means.

17. An arrangement as claimed in claim 15 in which said bridging means comprises a continuous surface supported on the stationary pole faces and extending about the shaft to form thereby said bridging means between adjacent pole faces.

18. An arrangement as claimed in claim 17 in which said continuous surface is provided by a bearing material operable to facilitate contact running at low shaft speeds.

* * * * *